(12) United States Patent
Kondo et al.

(10) Patent No.: US 6,474,740 B1
(45) Date of Patent: Nov. 5, 2002

(54) SEAT RECLINING DEVICE FOR A VEHICLE

(75) Inventors: Yuichi Kondo, Toyota; Tadasu Yoshida, Kariya; Yukifumi Yamada, Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 28 days.

(21) Appl. No.: 09/589,152

(22) Filed: Jun. 8, 2000

(30) Foreign Application Priority Data

Jun. 8, 1999 (JP) .......................................... 11-161354

(51) Int. Cl.[7] ................................................ B60N 2/22
(52) U.S. Cl. ...................................................... 297/367
(58) Field of Search ............................... 297/362, 367, 297/378.12, 363–365

(56) References Cited

U.S. PATENT DOCUMENTS

| | | | | |
|---|---|---|---|---|
| 3,737,946 A | * | 6/1973 | Giuliani | 297/367 |
| 4,082,352 A | * | 4/1978 | Bales et al. | 297/367 |
| 6,007,153 A | * | 12/1999 | Benoit et al. | 297/367 |
| 6,039,400 A | * | 3/2000 | Yoshida et al. | 297/367 |
| 6,082,821 A | * | 7/2000 | Baloche et al. | 297/367 |
| 6,092,874 A | * | 7/2000 | Kojima et al. | 297/367 |
| 6,328,838 B1 | | 12/2001 | Rohee et al. | |

FOREIGN PATENT DOCUMENTS

JP  9-183327  7/1997

* cited by examiner

*Primary Examiner*—Peter R. Brown
(74) *Attorney, Agent, or Firm*—Burns, Doane, Swecker & Mathis, LLP

(57) ABSTRACT

A seat reclining device for a vehicle includes a lower arm adapted to be fixedly arranged on a seat cushion member, an upper arm rotatably arranged with respect to the lower arm and adapted to be fixed on a seat back member, and a locking mechanism for locking the upper arm relative to the lower arm. The locking mechanism includes a rotatable cam and a spring. The spring is disposed between the lower arm and the cam to apply a biasing force to the cam. The spring is disposed so as to be wound around the rotational axis of the cam.

20 Claims, 5 Drawing Sheets

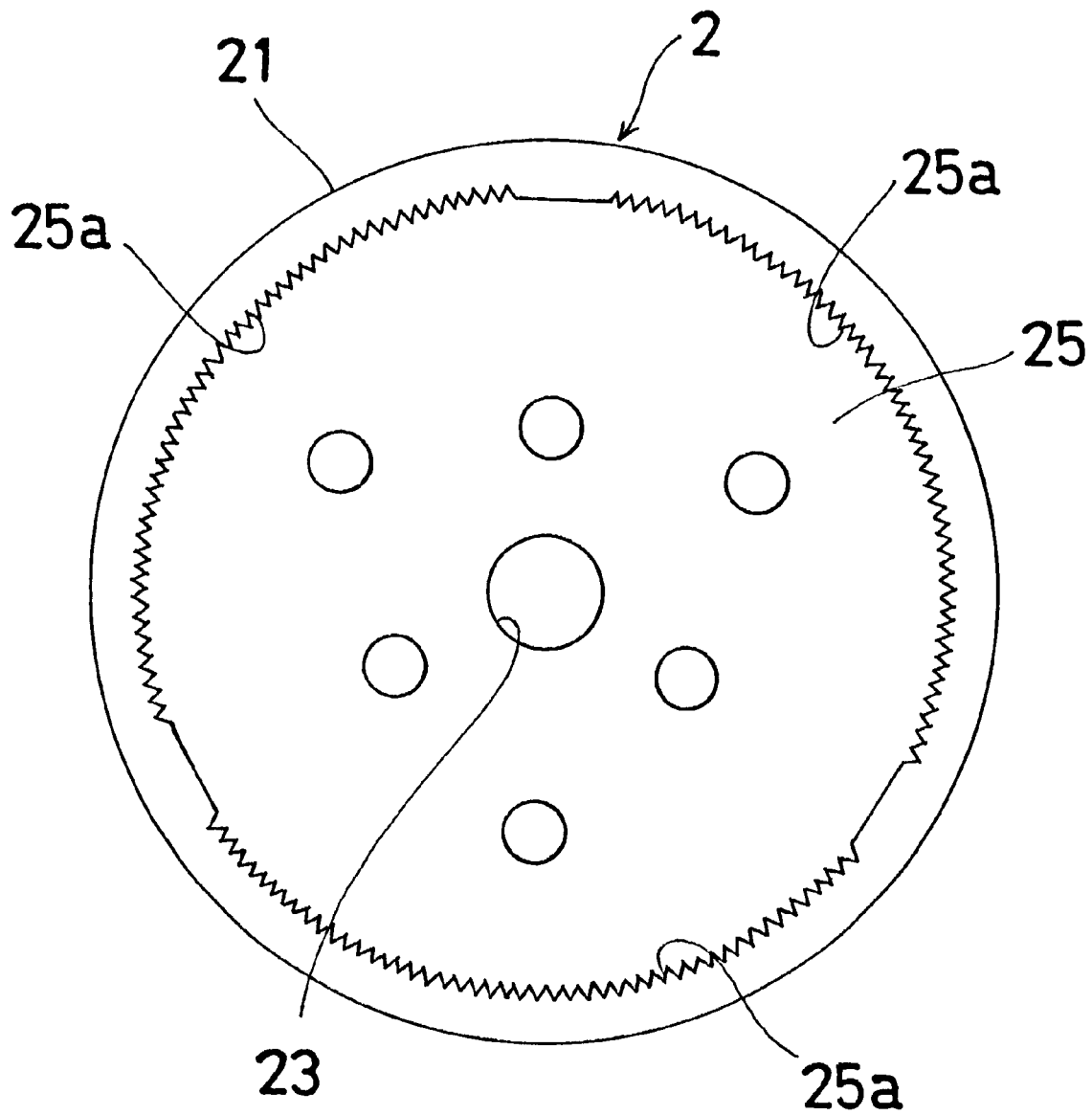

SEAT RECLINING DEVICE FOR A VEHICLE

This application is based on and claims priority under 35 U.S.C. §119 with respect to Japanese Application No. 11(1999)-161354 filed on Jun. 8, 1999, the entire content of which is incorporated herein by reference.

FIELD OF THE INVENTION

The present invention generally relates to a seat device. More particularly, the present invention pertains to a seat reclining device, particularly well suited for use in an automotive vehicle, for adjusting the angle of the seat back relative to the seat cushion.

BACKGROUND OF THE INVENTION

Unexamined Published Japanese Patent Application (Kokai) No. H09 (1997)-183327 discloses a reclining mechanism which includes a lower arm secured on the seat cushion member, an upper arm rotatably engaging the lower arm and secured on the seat back member, a locking mechanism which includes a cam and restricts the rotation of the upper and lower arms, and spiral springs disposed between the cam and the lower arm for actuating the lock mechanism to restrict the rotation of the upper arm relative to the lower arm. The spiral springs shown in the known reclining mechanism are arranged so that the winding axes of the springs are separated or different from the reclining device rotation axis.

A spiral spring is typically formed by winding steel wire on a cylindrical tool. In actual devices, a spiral spring is installed and utilized in the following way. The inner end of the steel wire is fixed on a shaft, with the shaft center matching the center of the cylindrical tool. The outer end of the steel wire is hooked on an object which moves along a path at a constant distance from the shaft center. Proportional to the rotation angle of the object, a smoothly increasing or decreasing spring force is obtained. The center of the path is called the dynamic center of the spiral spring. However, when the object moves on a path in which the path center does not match the dynamic center of the spiral spring (i.e., when the object approaches towards or moves away from the dynamic center), the spring is distorted in the radial direction. The spring force thus applied to the object varies irregularly, increasing up to an excessively large level.

The Japanese publication mentioned above shows a reclining device employing three spiral springs. The dynamic center of each spiral spring is disposed apart from the reclining device rotation axis. The inner ends of the spiral springs are secured on projections formed on the lower arm, and the outer ends of the spiral springs are hooked on a cam which rotates on the reclining device rotation axis. Therefor, the outer ends of the spiral springs approach or move away from their dynamic centers when the cam rotates, and large radial direction forces are applied by the each spiral spring to the cam. The radial direction forces in three directions cancel each other and prevent an increase of the friction force on the cam bearing with the shaft. However, this configuration requires three spiral springs and makes the reclining device relatively complicated and expensive.

In light of the foregoing, a need exists for a vehicle seat reclining device that is not as susceptible to the disadvantages and drawbacks discussed above.

A need thus exists for a vehicle seat reclining device which does not produce excessive rotation friction during operation of the device, yet which is relatively simple in construction and not excessively expensive.

SUMMARY OF THE INVENTION

According to one aspect of the invention, a seat reclining device for a vehicle includes a lower arm adapted to be fixedly arranged on a seat cushion member, an upper arm rotatably arranged with respect to the lower arm and adapted to be fixed on a seat back member, and a locking mechanism for locking the upper arm relative to the lower arm. The locking mechanism includes a rotatable cam and a spring. The spring is disposed between the lower arm and the cam to apply a biasing force to the cam. The spring is disposed so as to be wound around the rotational axis of the cam.

The lower arm is preferably provided with a first recessed portion containing the lock mechanism and a second recessed portion containing the spring, with both of the recessed portions being formed in series along the rotation axis of the cam.

According to another aspect of the present invention, a vehicle seat reclining device includes a lower arm adapted to be fixedly arranged on a seat cushion member, and an upper arm adapted to be fixed on a seat back member, with the upper arm being rotatable relative to the lower arm. A locking mechanism is adapted to lock the upper arm relative to the lower arm and includes a rotatable cam that is rotatable about a rotational axis of the cam. The cam is spring biased by a single spiral spring which applies a biasing force to the cam causing the cam to rotate about the rotational axis of the cam in a direction locking the upper arm relative to the lower arm.

In accordance with another aspect of the invention, a seat reclining device for a vehicle includes a lower arm adapted to be fixedly arranged on a seat cushion member and an upper arm adapted to be fixed on a seat back member, with one of the upper and lower arms being rotatable relative to the other. A locking mechanism locks one of the upper and lower arms relative to the other and includes a rotatable cam that is spring biased by a spiral spring which applies a biasing force to the cam causing the cam to rotate in a direction causing the locking mechanism to effect locking of the upper arm and lower arm relative to one another. The spring includes an inner end which engages a portion of the cam and an outer end which engages one of the upper and lower arms.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein:

FIG. 5 is a front view of the upper arm of the reclining device in accordance with the present invention.

DETAILED DESCRIPTION OF THE PREFERRED EMBODIMENT

Figure 1:
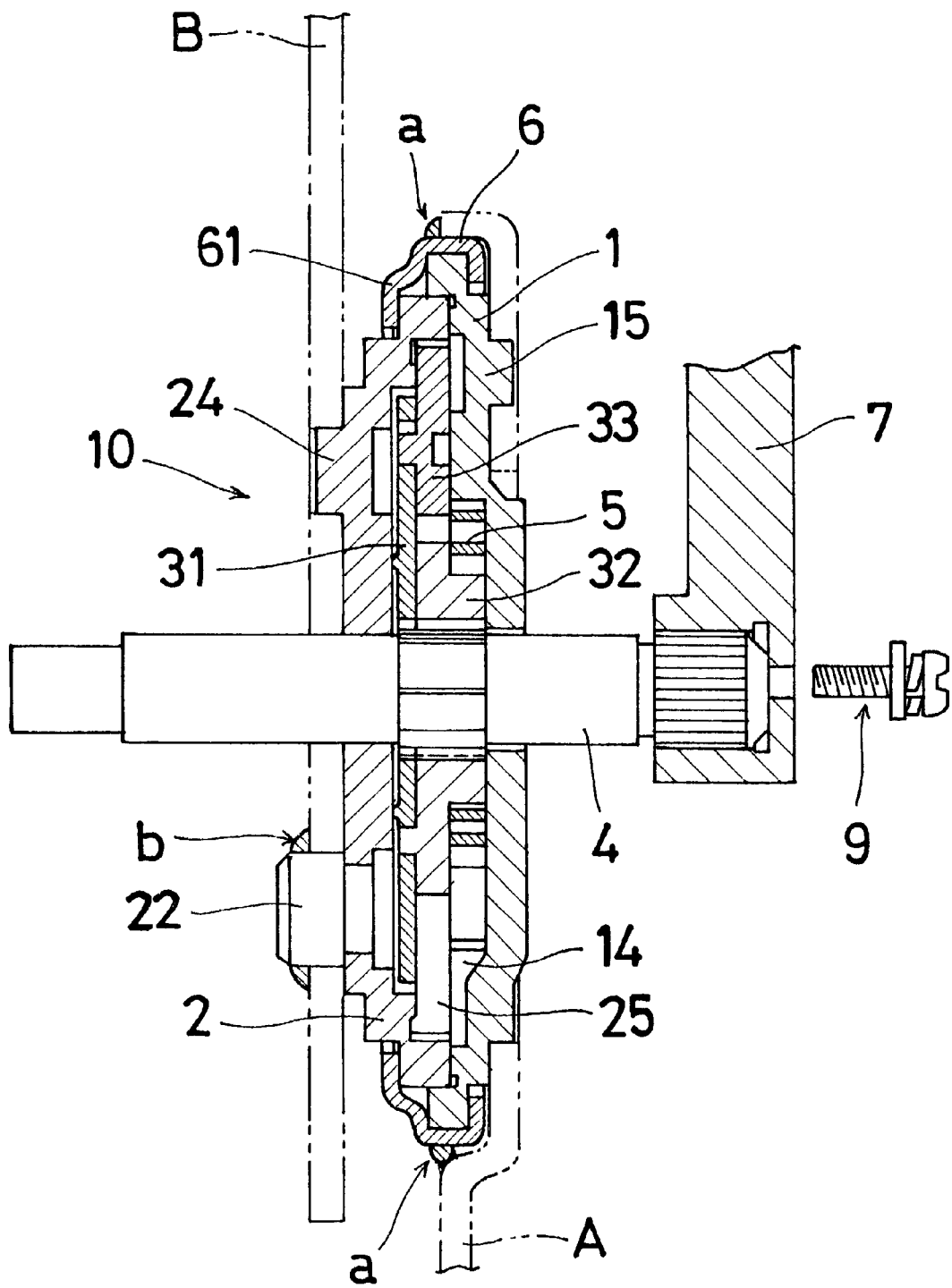
FIG. 1 is a cross sectional view of the seat reclining device in accordance with the present invention.
Figure 2:
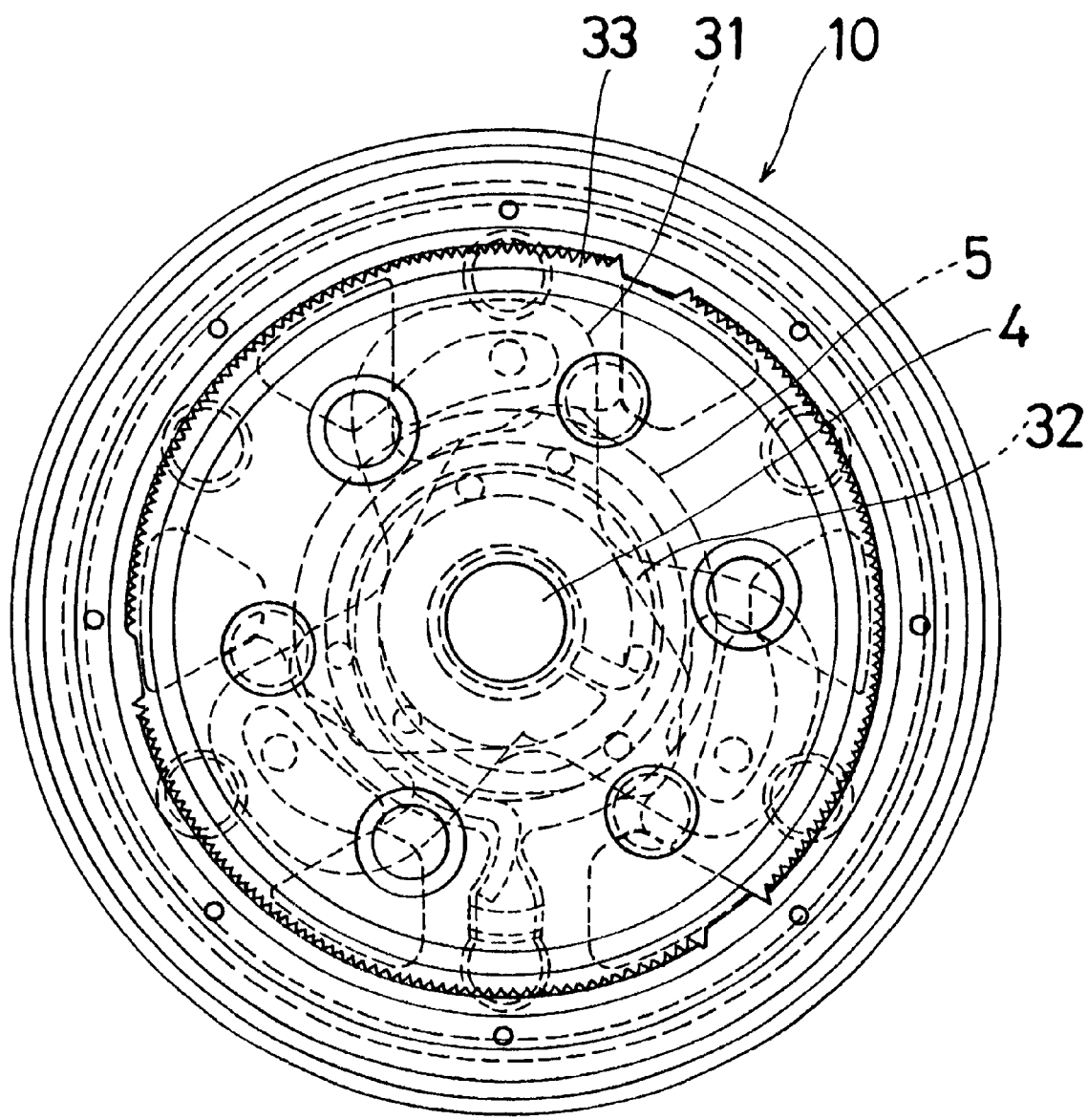
FIG. 2 is a side view of the seat reclining device in accordance with the present invention.

Referring initially to FIG. 1, the seat reclining device 10 of the present invention, which has particularly useful application to automotive vehicles, includes a lower arm 1 and an upper arm 2. The lower arm 1 is fixed on the seat cushion member A of the seat by virtue of projecting portions 15 on the lower arm 1 that engage holes on the seat cushion member A and by virtue of a holder part 6 being welded at part "a" with the seat cushion member A. The holder 6 fixedly holds the lower arm 1. The upper arm 2 is fixed on a seat back member B by virtue of projecting portions 24 on the upper arm 2 that engage holes on the seat back member B and by virtue of pins 22 fixed on the upper arm 2 being welded to the seat back member B at part "b". As shown in FIG. 1, the holder 6 that is fixed to the lower arm 1 also rotatably holds the upper arm 2.

Figure 3:
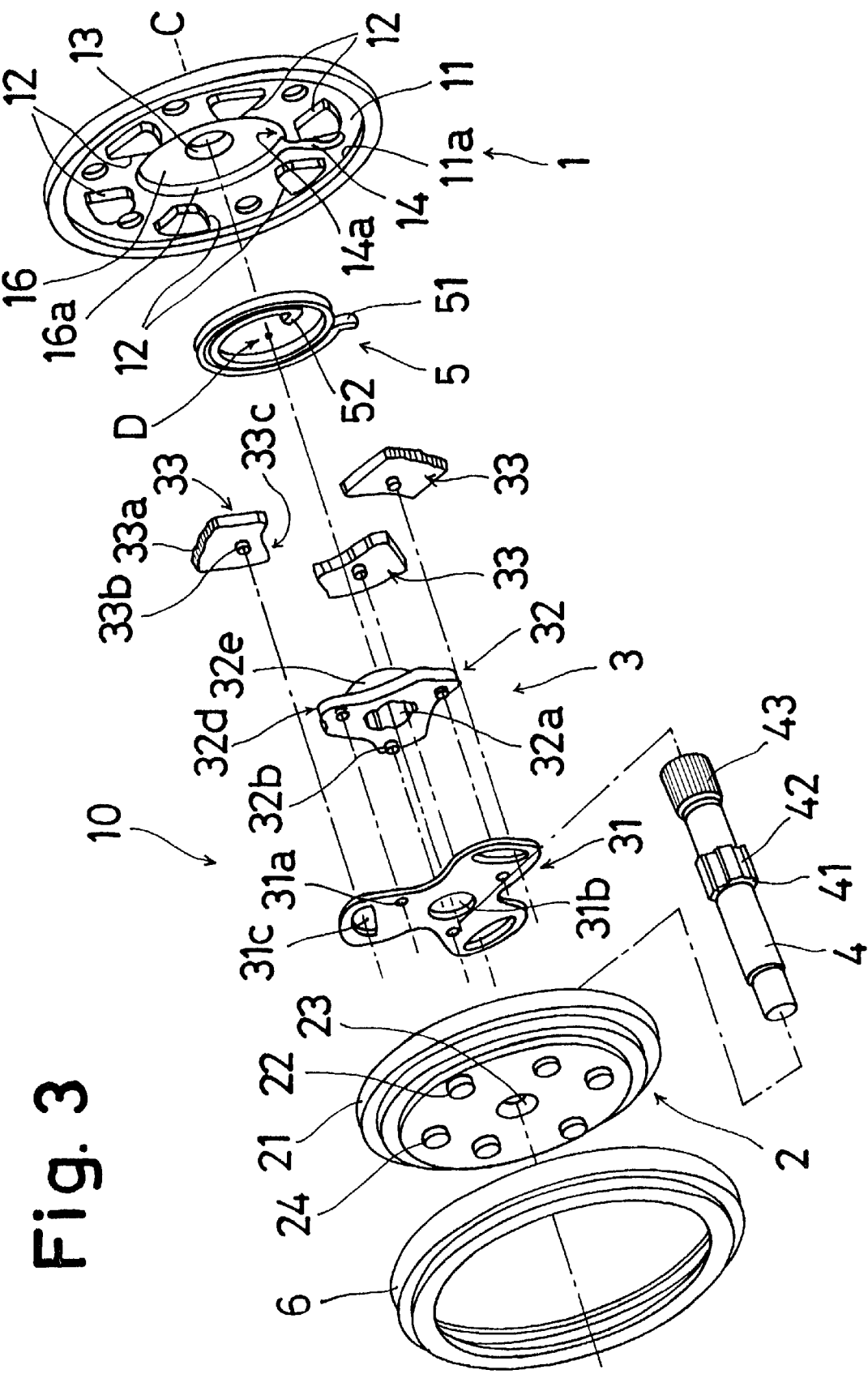
FIG. 3 is an exploded perspective view of the seat reclining device in accordance with the present invention.

As shown in FIGS. 1 and 3, a convex or recessed portion 11 is formed on the lower arm 1 in a partial pressing manner. The recessed portion is circular shaped and forms a first recessed portion in the lower arm 1. The recessed portion 11 opens to the side facing the upper arm 2. The recessed portion 11 forms or is surrounded by an inner circumference of the lower arm 1. The center (i.e., rotational center or center of radius) of the inner circumference 1 1a matches the rotation axis C of the reclining device as shown in FIG. 3. The upper arm 2 is disposed inside the recessed portion 11 of the lower arm 1 in the manner shown in FIG. 1 so that the outer circumference 21 of the upper arm 2 slides on the inner circumference 11a surrounding the recessed portion 11 of the lower arm 1. The slide engagement between the upper arm 1 and the upper arm 2 functions as the bearing engagement for rotation of both arms 1, 2.

As shown in FIG. 5, a circular shaped convex or recessed portion 25 is also formed on the upper arm 2. The recessed portion 25 opens to the side facing the lower arm 1. The inner circumference surrounding the recessed portion 25 is provided with an inner gear portion 25a. The center (i.e., the rotational center or center of radius) of this inner gear portion 25a or inner circumference coincides with the rotation axis C of the reclining device as illustrated in FIG. 5.

As shown in FIG. 3, a locking mechanism 3 is disposed between the lower arm 1 and the upper arm 2. The locking mechanism 3 includes a plurality of pawls 33, a cam 32, and a pawl plate 31. In the illustrated embodiment, the plurality of pawls 33 includes three pawls, each of which is held in a respective guide groove 12 in the lower arm 1. The guide grooves 12, which correspond in number to the number of pawls 33, are formed on the bottom surface of the recessed portion 11 of the lower arm 1 and extend in the radial direction from the rotation axis C of the reclining device. Each guide groove 12 is defined between the facing surfaces 12' of a pair of spaced apart raised lands on the bottom surface of the lower arm 1 as shown in FIG. 3. The three guide grooves 12 are distributed at equal angular intervals so that the grooves 12 are equally spaced apart. The three pawls 33 are thus guided in the radial direction of the lower arm 1 and the upper arm 2 within the respective grooves 12.

Each of the pawls 33 has an outer periphery provided with a gear profile 33a. The outer gear 33a on each pawl 33 is adapted to engage the inner gear 25a of the upper arm 2. A projecting portion 33b is also formed on each pawl 33.

The cam 32 is disposed inside the recessed portion 25 of the upper arm 2 and its rotation center is also arranged on the rotation axis C of the reclining device. The cam 32 is provided with three radially outwardly directed cam surfaces 32d. Each of the cam surfaces 32d touches on or engages the back surface 33c of one of the pawls 33. The back surface 33c of each pawl 33 is positioned on the side of the pawl 33 that is opposite the outer gear 33a. The cam 32 is also provided with several projecting portions 32b that extend from one surface of the cam 32.

The pawl plate 31 is fixedly mounted on one side of the cam 32 by virtue of the engagement of the three projecting portions 32b extending from the cam 32 with respective holes 31a on the cam plate 31. The pawl plate 31 and the cam 32 thus move together. The pawl plate 31 is also provided with three generally elongated cam openings 31c. The projecting portion 33b on each pawl 33 passes through one of the cam openings 31c in the pawl plate 31.

A hinge pin 4, which is disposed on and along the rotation axis C of the reclining device, passes through a centrally located hole 13 in the lower arm 1, a centrally located hole 32a in the cam 32, a centrally located hole 31b in the pawl plate 31 and a centrally located hole 23 of the upper arm 2. A plurality of fine longitudinally extending grooves 41 forming splines are provided on an intermediate portion, or mid part, of the hinge pin 4. The centrally located through hole 32a on the cam 32 is aligned with the rotation axis C of the reclining device and the inner periphery of the through hole 32a is provided with a spline that is adapted to mesh with the spline 41 of the hinge pin 4. Another spline 43 is formed at one end portion of the hinge pin 4 to permit connection to an operation handle 7. The operation handle 7 is also provided with an inner spline that engages the outer spline 43 on the end of the hinge pin 4. The operation handle 7 is fixed to the hinge pin by a screw device 9.

The lower arm 1 is also provided with another circular shaped recessed or convex portion 16 that is centrally located along the rotation center C of the reclining device and surrounded by the other recessed portion 11. This recessed portion 16 forms a second recessed portion in the lower arm 1 and is formed in a partial pressing manner. The second recessed portion 16 is thus concentric with and located inwardly of the first recessed portion 11.

A groove 14 extends radially outwardly from the inner recessed portion 16 and into the outer recessed portion 11. The groove 14 has an opening 14a on the inner circumference 16a of the recessed portion 16 so that the groove opens into the inner recessed portion 16.

Figure 4:
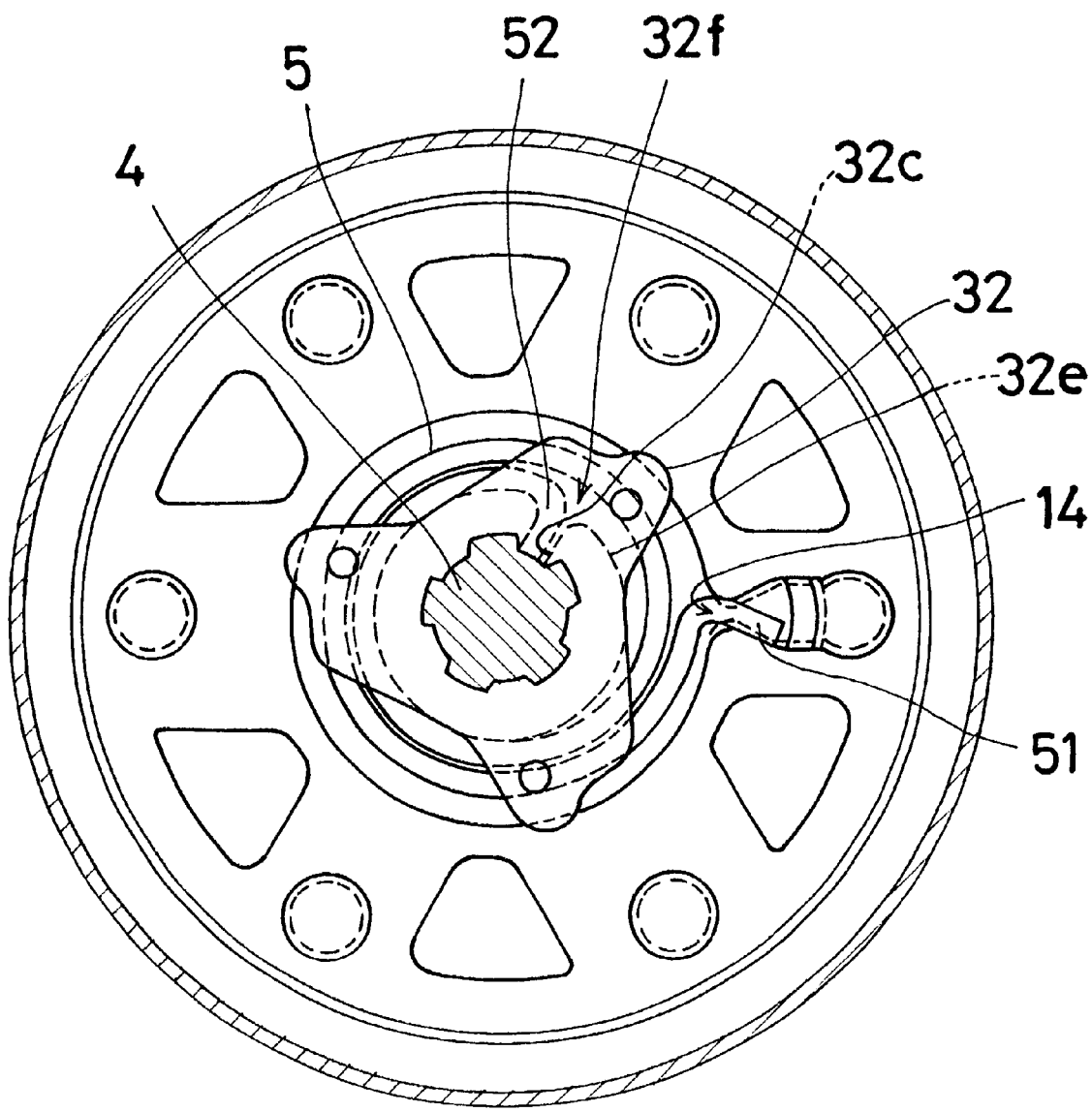
FIG. 4 is a side view similar to FIG. 2 showing the lower arm, the cam, and the spiral spring of the seat reclining device in accordance with the present invention.

The cam 32 includes a boss 32e coaxially arranged with respect to the rotational axis of the cam 32. A groove 32c is formed in the boss 32e of the cam 32. The groove 32c has an opening 32f on the outer circumference of the boss 32e as shown in FIG. 4 so that the groove opens to the outer surface of the boss 32e. As also illustrated in FIG. 4, the groove 32c extends radially inwardly of the boss 32e. When the device is assembled, both of the openings 14a, 32f are located in the space formed by the recessed portion 16.

A spiral spring 5 is also disposed in the recessed portion 16 so that the dynamic center D of the spiral spring 5 coincides with the rotation center C of the reclining device as depicted in FIG. 3. The spiral spring 5 includes an inner end portion 52 that passes through the opening 32f in the groove 32c of the boss 32 and is hooked in the groove 32c. The spiral spring 5 also includes an outer end portion 51 that passes through the opening 14a of the groove 14 and is hooked in the groove 14. With this arrangement, when the cam 32 rotates in the clockwise direction as seen with reference to FIG. 4, the spiral spring 5 is wound up or tightened. During rotation of the cam 32, the outer end portion 51 of the spring 5 is kept on a constant distance path from the dynamics center D of the spiral spring 5 (i.e., the distance of the outer end portion 51 of the spring 5 relative to the dynamics center D of the spiral spring 5 remains constant). It is also to be noted that the spiral spring 5 is positioned so that the windings of the spring are wound around the hinge pin 4 and around the rotational axis of the cam 32.

The holder 6 is attached in a bending way to the seat reclining device 10 during the final assembling process of the seat reclining device 10 to hold the lower arm 1 and the upper arm 2 to be relatively rotatable with respect to each other.

Having described the features associated with the seat reclining device of the present invention, the operation of the reclining device will now be explained. When the reclining device 10 is in the locked condition, the cam surfaces 32c of the cam 32 engage the back sides 33c of the pawls 33 and push all of the pawls 33 radially outwardly so that the outer gears 33a of the pawls 33 mesh with the inner gear 25a of the upper arm 2. As a result, relative rotation between the lower arm and the upper arm is restricted.

When the operation handle 7 is operated, the hinge pin 4 and the cam 32 rotate together in the clockwise direction in FIG. 4 against the spring force of the spiral spring 5. This releases the engagement of the cam surfaces 32d with the back side surfaces 33c of the pawls, and so the all pawls 33 are able to slide along the guides grooves 12 by virtue of the engagement of the projections 33b of the pawls 33 in the cam openings 31c of the pawl plate 31. The cam openings 31c in the pawl plate 31 are configured and oriented so that when the pawl plate 31 is rotated in the manner described above during operation of the handle 7, the projection 33b on each pawl 33 is guided along the respective cam opening 31c, through cam engagement with the opening, in a manner causing the pawl 33 to move or slide radially inwardly along the respective guide groove 12. The meshing engagement between the outer gear 33a of each pawl 33 and the inner gear 25 of the upper arm 2 is released. This allows the seat cushion frame A to be reclined relative to the seat back frame B.

When the operation handle 7 is released, the hinge pin 4 is rotated in the reverse direction from the above-mentioned direction by the spring force of the spiral spring 5. By virtue of the cam engagement between the cam openings 31c in the pawl plate 31 and the projections 33b on the pawls 33, all of the pawls 33 slide radially outwardly from the rotation center C of the reclining device. The cam surfaces 32d on the cam 32 once again engage the back side surfaces 33c of the pawls 33, and push the pawls 33 radially outwardly. As a result, the outer gear of each pawl 33 meshes with the inner gear 25a on the upper arm 2 to fix the seat cushion frame A relative to the seat back frame B and thus hold the angular position of the seat cushion frame A relative to the seat back frame B.

During the operation of the operation lever 7, the inner end portion 52 of the spiral spring 5 is hooked on the groove 32f that is formed on the boss 32e of the cam 3 and is thus maintained at a constant distance from the dynamic center D of the spiral spring 5. Also, as the spring 5 is tightened during operation of the handle 7, the spring 5 is wound about the rotational axis of the cam 32. By virtue of the construction described above, the cam 3 is not exposed to an undesirable and excessive radial direction force in a manner that would otherwise cause an increase in rotation friction.

The present invention thus provides a vehicle seat reclining device that is able to inhibit the creation of excessive rotation friction during operation of the device, yet is relatively simple in construction and not excessively expensive.

The principles, preferred embodiment, and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A seat reclining device for a vehicle comprising:
   a lower arm adapted to be fixedly arranged on a seat cushion member,
   an upper arm adapted to be fixed on a seat back member and rotatably arranged with respect to said lower arm,
   a locking mechanism for locking the upper arm relative to the lower arm, the locking mechanism including a rotatable cam, and
   a spring accommodated in a space between said lower arm and said upper arm, said spring being disposed between said lower arm and said cam and having a portion positioned in a groove in the cam to apply a biasing force to the cam, said cam having a rotational axis and said spring being disposed so as to be wound around the rotational axis of the cam.

2. The seat reclining device for a vehicle according to claim 1, wherein said space between said lower arm and said upper arm includes first and second recessed portions formed in the lower arm, the lock mechanism being positioned in the first recessed portion and the spring being positioned in the second recessed portion, said first and second recessed portions being concentrically located.

3. The seat reclining device for a vehicle according to claim 2, wherein the second recessed portion is located radially inwardly of the first recessed portion.

4. The seat reclining device for a vehicle according to claim 1, wherein the lock mechanism also includes a plurality of pawls, each of the pawls being positioned for sliding movement within a respective guide groove provided in the lower arm.

5. The seat reclining device for a vehicle according to claim 4, wherein the cam includes a plurality of radially outwardly directed cam surfaces that are each adapted to engage one of the pawls to urge the pawls outwardly.

6. The seat reclining device for a vehicle according to claim 5, wherein each pawl includes a projection, and including a pawl plate on which the cam is mounted, the pawl plate being provided with a plurality of cam grooves, the projection extending from each pawl being positioned in one of the cam grooves.

7. The seat reclining device for a vehicle according to claim 1, wherein the cam includes a boss in which is formed the groove, one end of said spring being held in the groove in the boss of the cam.

8. The seat reclining device for a vehicle according to claim 7, wherein the lower arm includes a groove, the other end of the spring being held in the groove in the lower arm.

9. The seat reclining device for a vehicle according to claim 1, wherein the lower arm includes a groove, one end of the spring being held in the groove in the lower arm.

10. A seat reclining device for a vehicle comprising:
    a lower arm adapted to be fixedly arranged on a seat cushion member,
    an upper arm adapted to be fixed on a seat back member, said upper arm being rotatable relative to the lower arm, a locking mechanism for locking the upper arm relative to the lower arm, the locking mechanism including a rotatable cam that is rotatable about a rotational axis of the cam, the cam having a boss portion and being spring biased by only a single spiral spring which is wound around the boss portion and applies a biasing force to the cam causing the cam to rotate about said rotational axis in a direction locking the upper arm relative to the lower arm, and the spring being accommodated in a space between the upper and lower arms.

11. The seat reclining device for a vehicle according to claim 10, wherein the space between said upper arm and said lower arm includes first and second recessed portions formed in the lower arm, the second recessed portion being located radially inwardly of the first recessed portion, the lock mechanism being positioned in the first recessed portion and the spring being positioned in the second recessed portion.

12. The seat reclining device for a vehicle according to claim 10, wherein the lock mechanism also includes a plurality of pawls, each of the pawls being positioned for sliding movement within a respective guide groove provided in the lower arm.

13. The seat reclining device for a vehicle according to claim 12, wherein the cam includes a plurality of radially outwardly directed cam surfaces that are each adapted to engage one of the pawls to urge the pawls outwardly.

14. The seat reclining device for a vehicle according to claim 13, wherein each pawl includes a projection, and including a pawl plate on which the cam is mounted, the pawl plate being provided with a plurality of cam grooves, the projection extending from each pawl being positioned in one of the cam grooves.

15. The seat reclining device for a vehicle according to claim 10, wherein the cam includes a boss concentrically positioned with respect to the rotational axis of the cam, one end of said spring engaging the boss of the cam.

16. The seat reclining device for a vehicle according to claim 15, wherein the lower arm includes a groove, the other end of the spring being held in the groove in the lower arm.

17. A seat reclining device for a vehicle comprising:

a lower arm adapted to be fixedly arranged on a seat cushion member, an upper arm adapted to be fixed on a seat back member, one of the upper arm and lower arm being rotatable relative to the other of the upper arm and lower arm, a locking mechanism for locking one of the upper arm and lower arm relative to the other of the upper arm and lower arm, the locking mechanism including a rotatable cam that is spring biased by a spiral spring which applies a biasing force to the cam causing the cam to rotate in a direction causing the locking mechanism to effect locking of the upper arm and lower arm relative to one another, the spiral spring being accommodated in a space between said lower arm and said upper arm, and said spring including an inner end which engages a portion of the cam and an outer end which engages one of the upper and lower arms.

18. The seat reclining device for a vehicle according to claim 17, wherein the space between said upper arm and said lower arm includes first and second recessed portions formed in the lower arm the lock mechanism being positioned in the first recessed portion and the spiral spring being positioned in the second recessed portion, said first and second recessed portions being concentric, the second recessed portion being located radially inwardly of the first recessed portion.

19. The seat reclining device for a vehicle according to claim 17, wherein the cam includes a boss in which is formed a groove, the inner end of the spiral spring being held in the groove in the boss of the cam, the lower arm including a groove in which is held the outer end of the spiral spring.

20. The seat reclining device for a vehicle according to claim 17, wherein the spiral spring includes windings that are wound around a rotational axis of the cam.

* * * * *